United States Patent
Weh et al.

(10) Patent No.: US 6,460,894 B1
(45) Date of Patent: Oct. 8, 2002

(54) FLUID LINE WITH A FILTER INSERT

(76) Inventors: Wolfgang Weh, Siemensstrasse 5, 89257 Illertissen (DE); Erwin Weh, Siemensstrasse 5, 89257 Illertissen (DE)

( * ) Notice: Subject to any disclaimer, the term of this patent is extended or adjusted under 35 U.S.C. 154(b) by 0 days.

(21) Appl. No.: 09/720,628
(22) PCT Filed: Jun. 24, 1999
(86) PCT No.: PCT/EP99/04384
§ 371 (c)(1), (2), (4) Date: Mar. 9, 2001
(87) PCT Pub. No.: WO99/67564
PCT Pub. Date: Dec. 29, 1999

(30) Foreign Application Priority Data

Jun. 24, 1998 (DE) ..................... 298 11 141 U

(51) Int. Cl.[7] .............................. F16L 37/00; B67D 5/58
(52) U.S. Cl. ........................... 285/81; 285/84; 285/364; 285/321; 210/447; 210/452
(58) Field of Search .................. 285/354, 364, 285/81, 84; 210/446, 447, 448, 452

(56) References Cited

U.S. PATENT DOCUMENTS

| | | | | |
|---|---|---|---|---|
| 4,018,686 A | * | 4/1977 | Shufflebarger et al. | 210/448 |
| 4,669,763 A | * | 6/1987 | Phillips | 285/354 |
| 4,894,156 A | * | 1/1990 | Murken | 285/305 |
| 5,580,103 A | * | 12/1996 | Hall | 285/354 |

FOREIGN PATENT DOCUMENTS

| | | |
|---|---|---|
| DE | 1 174 640 | 7/1964 |
| DE | 38 42 436 A1 | 6/1990 |
| DE | 3842436 * | 6/1990 |
| DE | 4335451 * | 4/1993 |
| DE | 43 35 451 A1 | 4/1995 |

OTHER PUBLICATIONS

English abstract for D 1 174 640.
English abstract for DE 43 35 451 A1.
English abstract for DE 38 42 436 A1.

* cited by examiner

*Primary Examiner*—Eric K. Nicholson
(74) *Attorney, Agent, or Firm*—Knobbe, Martens, Olson & Bear, LLP.

(57) ABSTRACT

A fluid line with a filter insert. The fluid line is adapted for efficient, safe transfer of fluids for fueling of vehicles. The fluid line includes a tubular housing with a filter element positioned therein. The fluid line also includes a slide-over or threaded sleeve arranged on a housing of the fluid line. The sleeve is mounted such that it can be readily moved for exchanging the filter element.

12 Claims, 2 Drawing Sheets

FLUID LINE WITH A FILTER INSERT

RELATED APPLICATIONS

Figure 1:
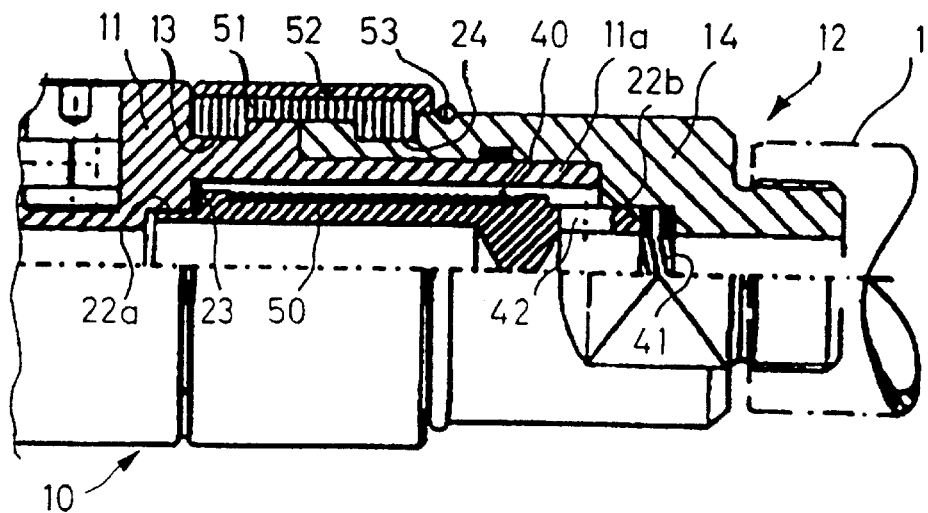

This application claims the benefit of the German application 298 11 141.1 filed Jun. 24, 1998 and the international application PCT/EP99/04384 filed Jun. 24, 1999.

The invention relates to a fluid line for transferring gaseous and/or liquid fluids, especially for fuelling vehicles.

Such fluid lines are provided to achieve a secure and rapid transmission of a fluid from a pressure source, e.g. from a fueling system. The relevant aspect is the secure operation and simple maintenance, thus ensuring simple handling.

Such a fluid line is described in EP-A-0 340 879 of the applicant, with several valves being provided in a quick-connection coupling with a housing and a fluid inlet and outlet in order to ensure the secure sealing of the fluid line until the connection is completely produced. Such valves of the quick-connection coupling are relatively sensitive to soiling, so that generally one or several filter elements are required. These must be cleaned in regular intervals, making it necessary to disassemble the coupling.

Such quick-connection couplings have proven their worth as a result of their high safety in connection with the fuelling of vehicles with gas. As a result of the increasing presence of gas-operated vehicles, fuelling is performed not only by the fuelling station attendants, but also by the driver per se, e.g. in in-house or corporate refuelling stations, which also require regular maintenance. Accidents may occur when the driver or attendant does not precisely reassemble the connection coupling or fluid line after cleaning or wrongly mounts the filter element. Considerable damage could occur as a result of a pressurised gas line. Moreover, considerable fluid quantities could leak out despite respective safety valves.

The invention is therefore based on the object of improving a fluid line of the kind mentioned above in respect of safety and simplification of mounting during maintenance, and filter maintenance in particular, in such a way that hazards and damage are avoided.

This object is achieved by a fluid line according to the features of claim 1. Preferred improvements of the invention are the subject matter of the subclaims.

The proposed fluid line is characterised by a particularly high amount of safety and simple (dis)assembly, because a simple separation of the connection is achieved, so that hazards and damage can be excluded. The leakage of gas or liquid is securely prevented during the detachment of the fluid line with the proposed fixture and/or lock, particularly in respect of the preferred embodiment for fuelling vehicles. This is particularly important for reasons of accident prevention, as also for reasons of environmental protection, thus avoiding the loss of any substantial volumes of gas.

Notice should be taken, however, that the proposed fluid line is suitable for various connections, in particular for connecting couplings for vehicle fuelling. The quick-exchange unit for the filter element can also be installed at any place in a fluid line, thus ensuring a secure and rapid separation of the filter line during the exchange or cleaning of the filter in a simple manner.

Figure 2:
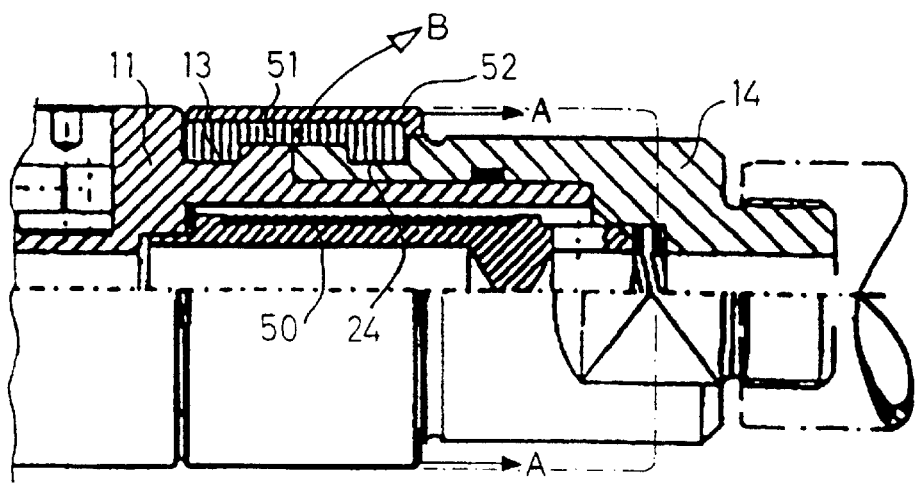
Figure 3:
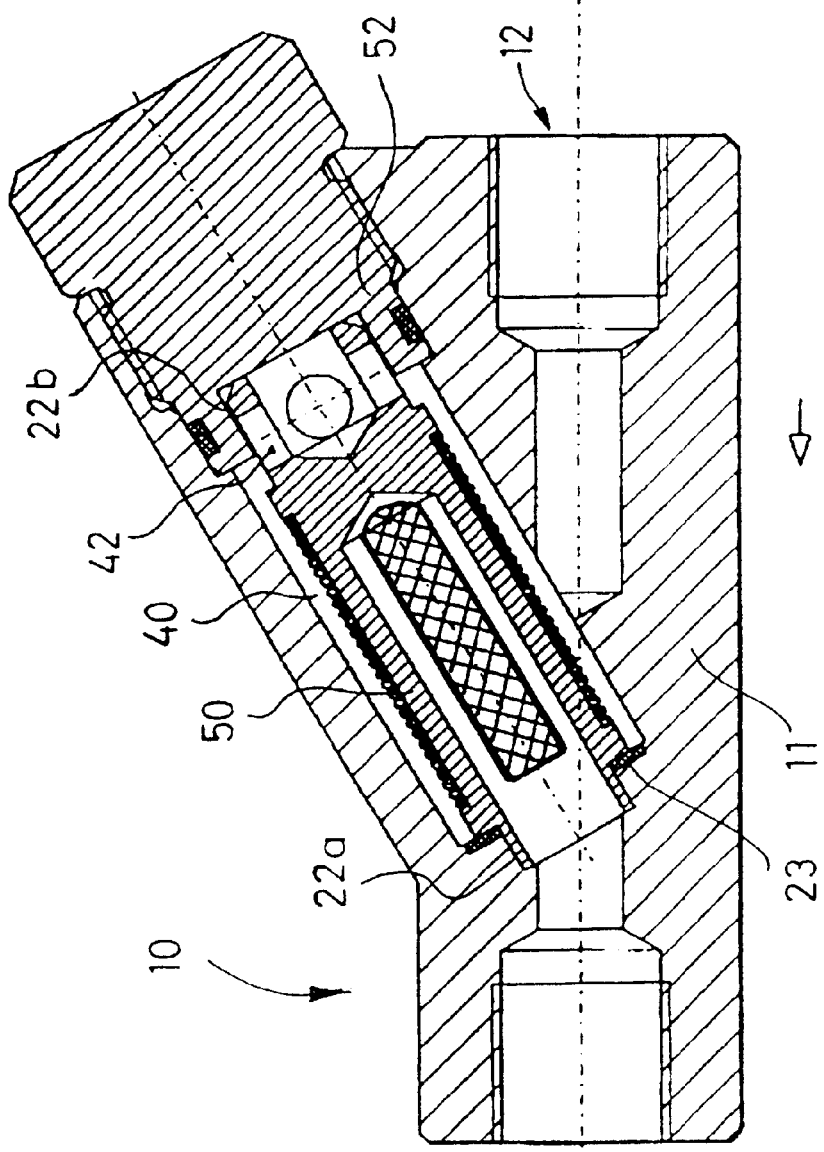

Two embodiments are explained below in closer detail by reference to the enclosed drawings, wherein:

FIG. 1 shows a side view of a fluid line in sections, with the fluid line being shown in a longitudinal semi-sectional view, FIG. 2 shows a respective view for clarifying the separating and maintenance position of the fluid line, and FIG. 3 shows a second, modified embodiment in a longitudinal sectional view.

FIG. 1 shows a preferred embodiment of a fluid line 10 with a partly shown quick-connection coupling. It is provided with a tubular housing 11 with a housing extension 11a, with the right face side being used as an inlet 12 and the left face side being used for the further transfer of the fluid to be transmitted, e.g. a connection nipple (not shown). The inlet 12 to the housing 11 is provided with a connecting adapter 14 which by means of a gasket seals off against housing 11 (or more precisely the housing element 11a) and is provided with an arrangement to be rotatable relative thereto. The connecting adapter 14 is additionally provided at its (in this case) right end with a thread on which tube 1 (or any conduit) for supplying the fluid to be transferred can be connected. The connecting adapter 14 can also be provided with an offset arrangement for example as an adaptation to the fluid to be transmitted, especially to the respectively desired feed angle, flow cross sections, etc. An external slide-over sleeve 52 is secured about the housing element 11a with a locking element 53 which is preferably fastened to the connecting adapter 14 as a retaining ring. Housing 11 is provided on its inner face side with a stepped sealing collar for abutment on a seal 23, so that the gaseous and/or liquid fluid which flows in substantially along the central axis of tube 1 cannot leak to the outside.

A filter element 50 is of particular importance, which element is inserted into the housing element 11a and an annular chamber 40 and is axially pressurised by a pressure spring 41. Pressure spring 41 rests to the left on a collar 22b of the connecting adapter 14 and acts to the right on the seal 23 in the vicinity of an annular surface 22a. As is shown in the drawing, the annular chamber 40 is in connection with the interior fluid passage by means of at least one radial bore 42. The annular surface 22a for guiding the filter element 50 is pushed here by the pressure spring 41 to the inwardly offset zone on the seal 23, thus simultaneously producing a stop for the displacing movement and a precise sealing.

In the connecting position, two semimonocoque shells are brought into mutual contact in particular during the radial insertion of the clamp-like segment shells 51, with said shells engaging in an interlocked manner into the circumferential grooves 13 and 24 and thus securely connecting the housing 11 and the connecting adapter 14 in the axial direction with one another. Similarly, seal 23 comes to rest against filter element 50, thus preventing any leakage of fluid. The semimonocoque shells 51 are received by the slide-over sleeve 52 and held together by the locking element 53. In this process, the filter element 50 is substantially displaced to the left only against the spring force of the pressure spring 41 which thus defines the pressing force of the seal.

In the separating or maintenance position according to FIG. 2, the slide-over sleeve 52 is pulled to the right (arrow A) to the position shown with the broken line, namely after the unlocking of the locking element 53. The segment and semimonocoque shells 51 can be retrieved in the radial direction (arrow B) as is known from DE-GM 89 10 276, so that the connecting adapter 14 can be released from the housing 11, especially for the purpose of exchanging the filter element 50. Notice should be taken that the filter element 50 is guided on the annular surfaces 22a and 22b in its active areas, so that the same is precisely fixed in housing 11 and is located in a specifically defined position. A particularly reliable sealing of the fluid line 10 is thus achieved. For the purpose of separating the fluid line 10, only the slide-over sleeve 52 is pulled back, so that the segment shells 51 can be removed in a radially outward manner after a short path.

This arrangement therefore allows a simple separation of the fluid line 10, with the segment shells 51 ensuring a secure connection and sealing after renewed mounting. The rapid exchangeability of the filter element 50 which is fastend to housing 11 is of particular importance. Filter element 50 is thus inserted into the connecting adapter 14 in a manner protected from any tensile forces by means of the encompassing semimonocoque shells 51 which are secured in the radial direction by a slide-over sleeve 52 After the detachment of a pin or the preferred retaining ring as locking element 53, the projecting components 52 and 51 can be removed in order to perform an exchange of the filter from time to time in a simple manner.

This also applies to the embodiment according to FIG. 3 in which the filter element 50 has been inserted under an acute angle (30° here) to the direction of flow in housing 11 by resting on seal 23 and by guidance on the annular surface 22a. As an alternative to the aforementioned slide-over sleeve 52, a threaded sleeve 52' is provided in this case which encompasses the filter element 50 like adapter 14 (in FIGS. 1 and 2) and thus securely fixes the same in housing 11. The seal 23 and the annular surface 22a produce a precise guidance and sealing as in FIGS. 1 and 2 because the threaded sleeve 52' securely fixes the outwardly facing end of the filter element 50 in annular chamber 40 in form of a second annular surface 22b.

What is claimed is:

1. A fluid line for transferring fluids comprising:
   a tubular housing;
   a filter element mounted therein;
   segment shells placed on the housing and arranged as mutually opposed semimonocoque shells; and
   a slide-over or threaded sleeve arranged on the housing wherein the sleeve is movably held in the housing for exchanging the filter element.

2. The fluid line of claim 1, further comprising a pressure spring provided in an annular chamber of the housing arranged so as to preload the filter element.

3. The fluid line of claim 2, further comprising a rotatable connecting adapter arranged along a fluid passage of the fluid line adjacent the annular chamber.

4. The fluid line of claim 3, wherein the annular chamber comprises at least a first annular surface and wherein the housing comprises an inner surface, the filter element being guided with the first annular surface at least on the inner surface of the housing.

5. The fluid line of claim 1, wherein the filter element is arranged as a cylindrical filter sleeve.

6. The fluid line of claim 1, further comprising at least one seal arranged towards the filter element in the housing.

7. The fluid line of claim 1, further comprising a locking element provided on the housing.

8. The fluid line of claim 3, wherein the housing comprises symmetrically arranged circumferential grooves and wherein the segment shells are releasable and engaged in an interlocked way in the symmetrically arranged circumferential grooves and on the connecting adapter.

9. The fluid line of claim 4, wherein the annular chamber further comprises a second, oppositely arranged annular surface.

10. The fluid line of claim 9, wherein the second annular surface is arranged in the connecting adapter.

11. The fluid line of claim 7, wherein the locking element is arranged as a retaining ring.

12. The fluid line of claim 8, further comprising a quick-connection coupling having an inlet and wherein the segment shells engage in an interlocked way in the circumferential grooves and on the connecting adapter at the inlet to the quick-connection coupling.

* * * * *